United States Patent [19]

Aberl et al.

[11] Patent Number: 5,255,285
[45] Date of Patent: Oct. 19, 1993

[54] FEEDBACK CONTROL SYSTEM FOR THE IMPEDANCE CONTROL OF AN ELECTRIC ARC FURNACE

[75] Inventors: Heinrich Aberl, Linz; Franz Rubenzucker, Traun, both of Austria

[73] Assignee: Voest-Alpine Industrieanlagenbau Gesellschaft m.b.H., Linz, Austria

[21] Appl. No.: 801,012

[22] Filed: Dec. 2, 1991

[30] Foreign Application Priority Data

Dec. 7, 1990 [AT] Austria .................. 2477/90

[51] Int. Cl.⁵ .......................... H05B 7/148
[52] U.S. Cl. ....................... 373/105; 373/102; 373/104; 373/106
[58] Field of Search ............. 373/106, 104, 105, 70, 373/102, 50

[56] References Cited

U.S. PATENT DOCUMENTS

| | | | |
|---|---|---|---|
| 2,367,979 | 1/1945 | Valentine | 373/106 |
| 2,921,107 | 1/1960 | Toothman et al. | 373/106 |
| 3,186,043 | 6/1965 | Murtland et al. | 373/105 |
| 3,662,075 | 5/1972 | Sakai et al. | 373/106 |
| 4,029,888 | 6/1977 | Roberts et al. | 373/106 |
| 4,096,344 | 6/1978 | Munson | 373/106 |
| 4,295,000 | 10/1981 | Mark | 373/106 |
| 4,324,944 | 4/1982 | Weibrich et al. | 373/105 |
| 4,349,912 | 9/1982 | Bello | 373/105 |
| 4,586,187 | 4/1986 | Hein et al. | 373/106 |
| 4,683,577 | 7/1987 | Bretthauer et al. | 373/105 |

FOREIGN PATENT DOCUMENTS 2841857 3/1980 Fed. Rep. of Germany .
2948787 6/1981 Fed. Rep. of Germany .

Primary Examiner—Bruce A. Reynolds
Assistant Examiner—Tu Hoang
Attorney, Agent, or Firm—Collard & Roe

[57] ABSTRACT

A feedback control system for the impedance control of an electric arc furnace having at least one electrode, a hydraulic electrode actuator for adjusting the electrode. The actuator is adapted to be supplied with hydraulic fluid through a control valve. The furnace further includes a controller, which is connected to the valve actuator for the control valve, and impedance signal generator for delivering impedance signals to one input of the controller and a setpoint signal generator for delivering a setpoint signal representing a desired impedance to another input of the controller. In order to prevent non-permissible electrode oscillations in such a feedback control system it is proposed to provide a correcting stage for correcting the controller gain and to provide a correcting signal generator for delivering to the correcting stage a signal which represents the controlled-system gain and which causes the correcting stage to change the controller gain in a sense which is opposite to a detected change of the controlled-system gain.

4 Claims, 1 Drawing Sheet

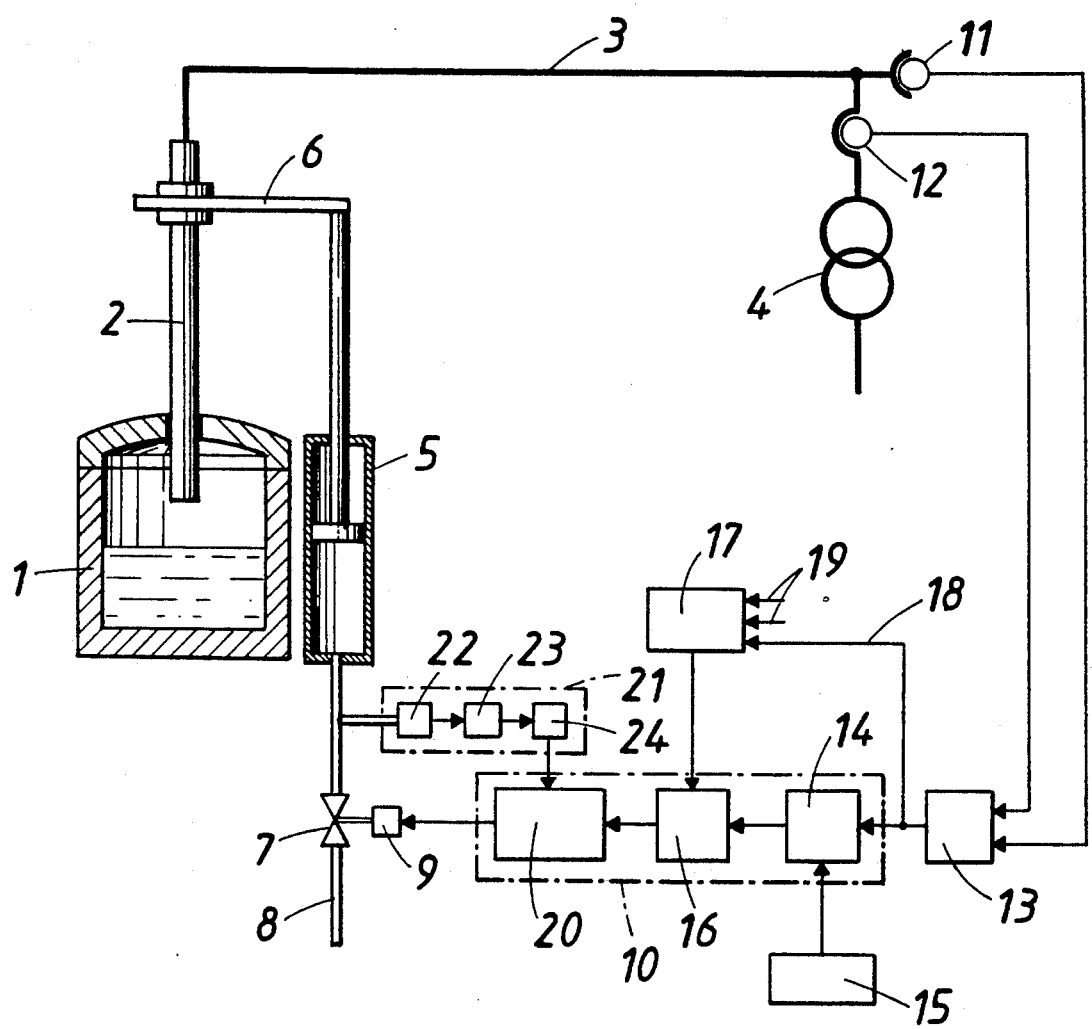

FEEDBACK CONTROL SYSTEM FOR THE IMPEDANCE CONTROL OF AN ELECTRIC ARC FURNACE

BACKGROUND OF THE INVENTION

1. Field of the Invention

This invention relates to a feedback control system for the impedance control of an electric arc furnace, which system comprises at least one electrode, a hydraulic electrode actuator for adjusting the electrode, which actuator is adapted to be supplied with hydraulic fluid through a control valve, an impedance signal generator for delivering impedance signals to one input of the controller, a setpoint signal generator for delivering a setpoint signal representing a desired impedance to another input of the controller, and a correcting stage for correcting the controller gain of the controller.

2. Description of the Prior Art

In an electric arc furnace which is connected to a transformer the phase voltages and phase currents which are available on the secondary side of the transformer vary with the length of the electric arc or arc gap between a furnace electrode and the molten or meltable material in the furnace. As the ratio of the voltages and currents depends on the actual impedance, the impedance may be used as a controlled variable for a control of the length of the electric arc or arc gap by means of an electrode actuator for adjusting the electrode. For this purpose it is known from German Patent Specification 29 48 787 to calculate the actual impedance from the actual values of the measured phase voltages and phase currents and to compare the actual impedance with a predetermined desired impedance and in case of a deviation consisting of a difference between the desired and actual impedances to control the electrode actuator for the associated electrode by means of a corresponding manipulated variable delivered by a controller so that the deviation will be eliminated. In that case, electrical and mechanical oscillations may be excited in the electrode, which is held in a carrying arm, and the electrodes may be mechanically overloaded if such oscillations are excited at or near a resonant frequency of the oscillatable system consisting of the electrode and its carrying arm.

In an effort to ensure that oscillations of the electrodes and the associated carrying arms which are due to current fluctuations will be reduced to a permissible value, it has been proposed in Published German Application 28 41 857 to reduce the controller gain in dependence on the magnitude of any oscillations which may occur in the controlled variable, i.e., in the impedance which is calculated from the phase voltage and phase current, so that the substantially reduced controller gain will damp any oscillations of the controlled variable before they can affect the manipulated variable. But even that measure will not reliably prevent an occurrence of non-permissible electrode oscillations, particularly under different operating conditions.

SUMMARY OF THE INVENTION

It is an object of the invention to provide for the impedance control of an electric arc furnace a feedback control system which is of the kind described first hereinbefore and is provided with comparatively simple means which will ensure that non-permissible electrode oscillations will reliably be suppressed even under different operating conditions.

That object is accomplished in accordance with the invention in that the stage for correcting the controller gain is operable to change the controller gain in a sense which is opposite to a change of the controlled-system gain under the control of a correcting signal generator delivering a signal representing the controlled-system gain.

The invention is based on the recognition that the dynamic response of the feedback control system will be influenced by the dependence of the impedance on the arc length and that the dependence is nonlinear so that the dynamic response of the feedback control system cannot be independent from the instantaneous arc length, i.e., from the instantaneous operating point, unless the controller gain is corrected in dependence on the instantaneous controlled-system gain, which is determined by the ratio of the impedance change to the change of the arc length and owing to the nonlinear dependence of the impedance on the arc length the controlled-system gain will change in dependence on the arc length. For this reason a control by which the overall gain of the feedback control system is kept at least approximately constant will preclude fluctuations in the range of the dynamic response of the feedback control system so that oscillations resulting from such fluctuations will be suppressed. For that purpose the controlled-system gain is calculated in accordance with known formulas from the impedance in consideration of the electric resistances of the leads and the controlled-system gain thus calculated is used to control the controller gain by means of a correcting stage in such a manner that the overall gain of the feedback control system will be kept constant. If it can be assumed that the relationship between the impedance and the arc length is substantially linear close to the selected operating point, as will usually be the case, the correcting signal generator for delivering a signal representing the controlled-system gain will not require a signal representing the actual impedance, provided that the impedance is automatically controlled, and in that case the currently desired impedance can be used in the calculation of the controlled-system gain.

Particularly desirable conditions as regards the suppression of oscillations can be obtained if a further feature is adopted, which resides in that the controller is connected to a pickup for delivering a signal derived from the hydraulic pressure oscillations of the hydraulic pressure in the electrode actuator as a disturbance variable to the controller. By that disturbance feedforward, any oscillations occurring in the hydraulic electrode actuator can be eliminated by a control on a short path because such oscillations will be reflected in the hydraulic pressure applied to the electrode actuator and can be used for a compensating control of the valve for controlling the pressure applied to the electrode actuator. In that connection it must be borne in mind that the natural frequencies of the oscillatable system consisting of the electrode and the carrying arm are low frequencies. For this reason it is recommendable to provide in association with the pickup for the hydraulic pressure oscillations an oscillation filter that is tuned to the fundamental frequency of the electrode held in a carrying arm so that pressure oscillations near the fundamental frequencies will prefer initially be corrected.

BRIEF DESCRIPTION OF THE DRAWING

An illustrative embodiment of the invention is represented in the drawing, which is a schematic block circuit diagram illustrating a feedback control system in accordance with the invention for the impedance control of an electric arc furnace.

DETAILED DESCRIPTION OF THE PREFERRED EMBODIMENT

In the drawing, the usually three-phase power supply of the electric arc furnace 1 is represented in a simplified form only as a single-phase circuit comprising only a single electrode 2, which defines an arc gap with the molten or meltable material in the furnace 1 and is connected by an electric lead 3 to the secondary side of a transformer 4 and can be vertically adjusted by a hydraulic electrode actuator 5. That electrode actuator 5 consists in the usual manner of a hydraulic cylinder, which acts on a carrying arm 6, by which the electrode 2 is carried. Hydraulic fluid under pressure is supplied to the cylinder 5 through a control valve 7, which is included in a line 8 for supplying hydraulic fluid to the cylinder 5. The valve actuator 9 for that control valve 7 is controlled by a controller 10 in dependence on the actual impedance of the electric circuit which includes the electrode 2 and the associated arc gap. For that purpose the phase voltage and the phase current on the secondary side of the transformer 4 are detected by a voltage transformer 11 and a current transformer 12, the outputs of which are delivered to an impedance signal generator 13, in which the actual value of the impedance is calculated by a division of the actual values of the phase voltage and the phase current. The calculated actual impedance is compared in a difference-forming stage 14 of the controller 10 with the desired impedance, which is represented by a signal delivered to the stage 14 from a setpoint generator 15, and the deviation which is used to determined the manipulated variable is thus calculated. But in contrast to conventional controllers the deviation is not used as such for a compensation of the deviation of the controlled variable but is delivered to a correcting stage 16, in which the signal representing the deviation is corrected in dependence on the controlled-system gain so as to maintain the overall gain of the feedback control system constant. For that purpose the correcting stage is connected to a correcting signal generator 17 for generating a signal representing the controlled-system gain, which in the embodiment shown by way of example is calculated from the actual impedance with an allowance for the resistance and inductive reactance of the electric lead 3. Signals representing the actual impedance are delivered to the correcting signal generator 17 from the impedance signal generator 13 via a branch line 18. The values of the resistance and reactance are measured or calculated and will depend on the existing leads and may be considered constant. These signals are delivered to the correcting signal generator 17 via corresponding inputs 19.

Because the controlled system gain depends on the ratio of the impedance to the arc length and the dependence of the impedance on the arc length is nonlinear, the use of a controller having a constant controller gain would have the result that a change of the arc length caused, e.g., by a change of the operating conditions would result also in a change of the dynamic control response of the feedback control system although such a change should desirably be avoided. For this reason the controller gain is changed in a sense which is opposite to the sense in which the controlled-system gain is changed so that the over-all gain corresponding to the product of the controller gain and controlled-system gain will remain constant and, as a result, the dynamic control response will be constant too. In the embodiment shown by way of example the correcting stage 16 for controlling the controller gain influences the signal which represents the deviation. But that is not the only way in which a correction can be effected because the controller gain may alternatively be changed by an influence on the actual impedance signal or on the manipulated variable.

In dependence on the corrected input signal fed to the final stage 20 of the controller 10 the manipulated variable appearing at the output of the controller stage 20 will match the instantaneous operating point and will ensure that the automatic control of the electrode in dependence on the impedance will not give rise to oscillations near that operating point.

For a direct elimination of oscillations occurring adjacent to the electrode actuator 5, hydraulic pressure oscillations occurring adjacent to the hydraulic cylinder 6 are detected by a pickup 21, which delivers a corresponding disturbance variable to the controller stage 20 so that a control that opposes the pressure oscillations can be effected on a short path by a suitable influence on the manipulated variable for controlling the control valve 7. The pickup 21 for the hydraulic pressure oscillations comprises a pressure gauge, which is connected in series with a difference-forming stage 23 so that only the oscillations of the pressure will be detected. An oscillation filter 24 may be associated for a preferential response to the pressure fluctuations near the natural frequencies of the oscillatable system consisting of the electrode 2 and the carrying arm 6.

It will be understood that the invention is not restricted to the embodiment shown by way of example. For instance, the correcting signal generator 17 for indicating the controlled-system gain may be connected on its input side to the setpoint signal generator 15 rather than to the impedance signal generator 13 so that the controller gain will be changed only by a change of the setpoint in dependence on a desired change of the operating point. That mode of operation can readily be adopted if the impedance is properly controlled because a linear response can be expected near an operating point.

We claim:

1. A feedback control system having a controlled system gain for controlling the impedance of an electric arc furnace containing material to be melted comprising:

at least one electrode having a free end located within the electric arc furnace, wherein the distance from said free end of said at least one electrode to the material defines an arc gap;

a hydraulic electrode actuator coupled to said at least one electrode and including a supply of hydraulic fluid for adjusting the position of said at least one electrode to change the arc gap;

a control valve coupled to said hydraulic electrode actuator for controlling the supply of hydraulic fluid;

a valve actuator coupled to said control valve for controlling said control valve;

a controller coupled to said valve actuator and including a correcting stage, a difference-forming stage having a first and second inputs and a final stage to provide a corrected controller gain for controlling said valve actuator;

an actual impedance signal generator coupled to said first input for transmitting a signal representing an actual impedance of the feedback control system to said controller;

a set point signal generator coupled to said second input for transmitting a signal representing a desired impedance value to said controller, said controller comparing the actual impedance to the desired impedance to calculate said controlled controller gain; and a correcting signal generator coupled to said correcting stage for transmitting a correction signal representing the controlled system gain, wherein said correcting stage adjusts said controlled controller gain in inverse proportion to said controlled system gain to calculate the corrected controller gain, whereby fluctuations in dynamic responses of the feedback control system are suppressed.

2. A feedback control system according to claim 1, additionally including a pick-up for detecting hydraulic pressure oscillations in said valve actuator, said pick-up being coupled to said controller for transmitting a signal to said controller representative of a disturbance variable derived from the pressure oscillations.

3. A feedback control system according to claim 2, additionally including
a carrying arm coupled to said at least one electrode, said at least one electrode and said carrying arm defining an oscillation system having a fundamental frequency, and
an oscillation filter, tuned to said fundamental frequency, coupled between said pick-up and said controller for detecting the hydraulic pressure oscillations.

4. A feedback control system according to claim 1, additionally including an overall gain defined by the product of the controlled controller gain and the controlled system gain, wherein said correcting stage adjusts the controller gain to maintain a constant overall gain.

* * * * *